(12) United States Patent
Seo et al.

(10) Patent No.: US 9,154,600 B2
(45) Date of Patent: Oct. 6, 2015

(54) HOLD FUNCTION CONTROL METHOD AND APPARATUS FOR MOBILE TERMINAL

(75) Inventors: Won-Woo Seo, Gumi-si (KR); Hak-Yeol Kim, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 2097 days.

(21) Appl. No.: 11/642,832

(22) Filed: Dec. 21, 2006

(65) Prior Publication Data

US 2008/0045171 A1 Feb. 21, 2008

(30) Foreign Application Priority Data

Jul. 21, 2006 (KR) .................. 10-2006-0068250

(51) Int. Cl.
*H04M 1/00* (2006.01)
*H04M 1/725* (2006.01)

(52) U.S. Cl.
CPC ...... *H04M 1/72519* (2013.01); *H04M 1/72513* (2013.01)

(58) Field of Classification Search
CPC ................................................ H04M 1/75219
USPC ............ 379/393; 455/186.2, 556; 341/22, 26
See application file for complete search history.

(56) References Cited

U.S. PATENT DOCUMENTS

| | | | | |
|---|---|---|---|---|
| 5,521,575 A | * | 5/1996 | Pack | 341/26 |
| 5,805,084 A | * | 9/1998 | Mannisto | 341/22 |
| 5,900,829 A | * | 5/1999 | Gardner et al. | 341/26 |
| 5,914,677 A | * | 6/1999 | Ahmadian | 341/26 |
| 6,188,889 B1 | * | 2/2001 | Tsai | 455/420 |
| 2001/0053707 A1 | * | 12/2001 | Lutnaes | 455/566 |
| 2004/0121802 A1 | | 6/2004 | Kim et al. | |
| 2004/0124712 A1 | * | 7/2004 | Yoon | 307/66 |
| 2004/0233064 A1 | * | 11/2004 | Tseng et al. | 340/636.15 |
| 2004/0266475 A1 | * | 12/2004 | Mirza et al. | 455/550.1 |
| 2006/0046694 A1 | * | 3/2006 | Yu | 455/411 |

FOREIGN PATENT DOCUMENTS

| | | | | |
|---|---|---|---|---|
| EP | 0453089 a2 | * | 10/1991 | ............. H04M 1/72 |
| GB | 2314739 A | * | 1/1998 | |
| JP | 09-107324 | | 4/1997 | |
| KR | 1996-0016320 | | 5/1996 | |

* cited by examiner

*Primary Examiner* — Sonia Gay
(74) *Attorney, Agent, or Firm* — Jefferson IP Law, LLP

(57) ABSTRACT

A method and apparatus for hold function control in a mobile terminal are disclosed. The hold function control apparatus includes a controller including a general purpose input/output (GPIO) port, a constant voltage power unit for supplying a preset constant voltage, and a hold key for generating a voltage change at the GPIO port by making an instantaneous electrical contact between the GPIO port and the constant voltage power unit, wherein the controller senses the voltage change generated at the GPIO port. As a result, a hold function cancellation command can be directly recognized through a hardware mechanism, thus reducing the time necessary to cancel the hold function setting.

13 Claims, 3 Drawing Sheets

HOLD FUNCTION CONTROL METHOD AND APPARATUS FOR MOBILE TERMINAL

CROSS-REFERENCE TO RELATED APPLICATIONS

This application claims the benefit under 35 U.S.C. §119(a) of Korean Patent Application No. 2006-0068250, filed Jul. 21, 2006 in the Korean Intellectual Property Office, the entire disclosure of which is hereby incorporated by reference.

BACKGROUND OF THE INVENTION

1. Field of the Invention

The present invention relates generally to a method and apparatus for hold function control in a mobile terminal. More particularly, the present invention relates to a hold function control method and apparatus for a mobile terminal wherein the hold function setting is cancelled through a hardware mechanism.

2. Description of the Related Art

A mobile terminal hold function provides a protection function when using the mobile terminal. When the hold function is set, key inputs are blocked. Normally, the hold function is set or cancelled by selecting a particular hold key.

FIG. 1 illustrates a configuration of a conventional key input recognition mechanism in a mobile terminal.

After power-on, when a user presses a particular key of a key input unit 115, a control unit 119 recognizes the key selection. For example, when one of the 12 alphanumeric keys (in 3 rows of 4 keys) is assigned as a hold key 115a, if the hold key 115a is pressed, a predetermined period of time is taken for the control unit 119 to determine which key is selected. Further, when a hold function is set, if the user presses the hold key 115a to cancel the hold function setting, the control unit 119 may have to execute a software routine to recognize selection of the hold key 115a as a command of hold function cancellation. However, a significant delay of 4~5 seconds may be required to cancel the hold function setting using such a conventional procedure.

SUMMARY OF THE INVENTION

The present invention has been made in view of the above problems, and an object of the exemplary embodiments of the present invention is to provide a hold function control method and apparatus for a mobile terminal that reduces the time delay necessary to determine whether a hold key is selected.

In accordance with an exemplary embodiment of the present invention, there is provided a hold function control apparatus for a mobile terminal. The hold function control apparatus includes a controller having a general purpose input/output (GPIO) port, a constant voltage power unit for supplying a preset constant voltage, and a hold key for generating a voltage change at the GPIO port by making an instantaneous electrical contact between the GPIO port and the constant voltage power unit, wherein the controller senses the voltage change generated at the GPIO port.

In accordance with another exemplary embodiment of the present invention, there is provided a hold function control method for a mobile terminal whose control unit includes a general purpose input/output (GPIO) port. The hold function control method includes determining whether a hold function is set, detecting a voltage change at the GPIO port, recognizing, if the hold function is set, the detected voltage change as input of a hold key, and canceling setting of the hold function according to input of the hold key.

BRIEF DESCRIPTION OF THE DRAWINGS

The above and other objects, exemplary features and advantages of the present invention will become more apparent from the following detailed description of certain exemplary embodiments thereof when taken in conjunction with the accompanying drawings, in which.

Throughout the drawings, like reference numbers should be understood to refer to like elements, features, and structures.

DETAILED DESCRIPTION OF EXEMPLARY EMBODIMENTS

The matters exemplified in this description are provided to assist in a comprehensive understanding of various exemplary embodiments of the present invention disclosed with reference to the accompanying figures. Accordingly, those of ordinary skill in the art will recognize that various changes and modifications of the exemplary embodiments described herein can be made without departing from the scope and spirit of the claimed invention. Descriptions of well-known functions and constructions are omitted for clarity and conciseness.

Figure 1:
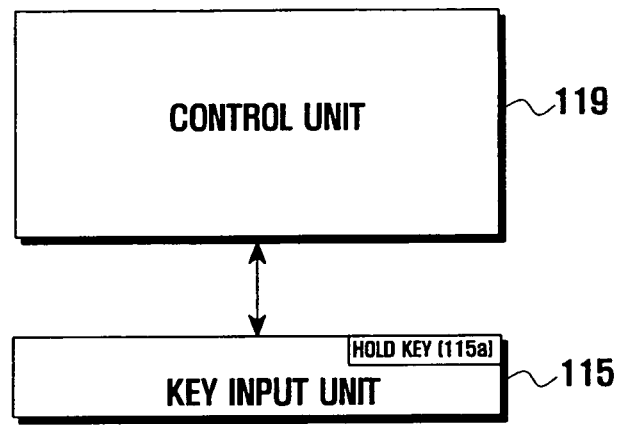
FIG. 1 illustrates a configuration of a conventional key input recognition mechanism in a mobile terminal.
Figure 2:
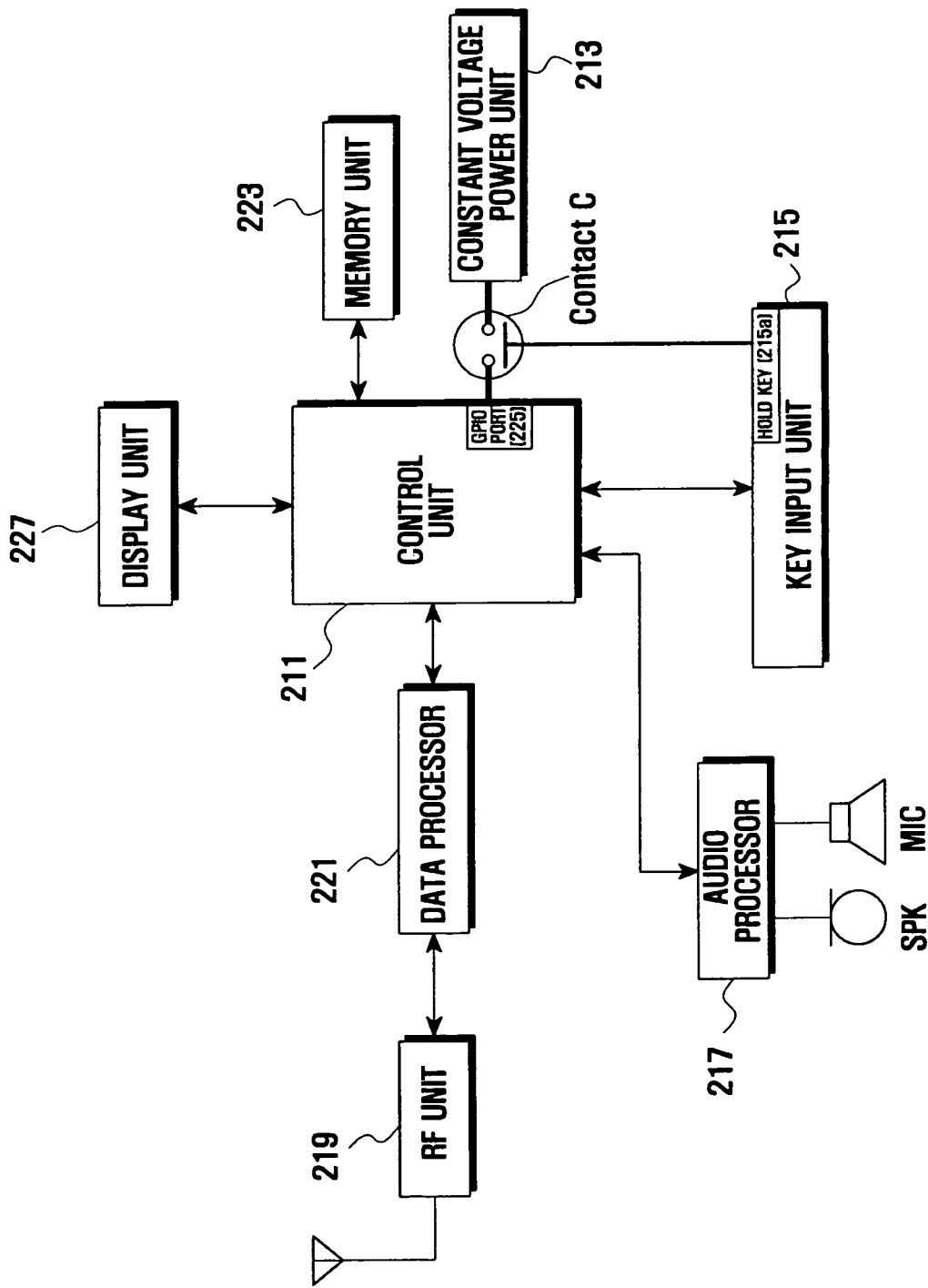
FIG. 2 illustrates a configuration of a mobile terminal according to an exemplary embodiment of the present invention.

FIG. 2 illustrates a configuration of a mobile terminal according to an exemplary embodiment of the present invention.

Referring to FIG. 2, the mobile terminal includes a control unit 211 including a general purpose input/output (GPIO) port 225, a constant voltage power unit 213, a key input unit 215 including a hold key 215a, an audio processor 217, a radio frequency (RF) unit 219, a data processor 221, a memory unit 223, and a display unit 227.

The key input unit 215 includes a plurality of keys for inputting numeric data and text data, and a plurality of function keys for setting functions of the mobile terminal. The key input unit 215 may further include shortcut keys. For example keys '#' or '*' may be a shortcut key of the hold key 215a for hold function control. One of 12 alphanumeric keys in 3 rows of 4 keys, or a key other than the 12 keys, may be assigned as the hold key 215a.

The audio processor 217 reproduces an audio signal from an audio coder/decoder (codec) of the data processor 221 through a speaker SPK, and transmits an audio signal from a microphone MIC to the audio codec of the data processor 221.

The RF unit 219 performs wireless communication operations for the mobile terminal. The RF unit 219 includes an RF transmitter for upconverting the frequency of a signal to be transmitted and amplifying the signal, and an RF receiver for low-noise amplifying a received signal and downconverting the frequency of the signal.

The data processor 221 encodes and modulates a signal to be transmitted, and demodulates and decodes a received signal. The data processor 221 may include a modulator/demodulator (modem) and a codec. The codec includes a data codec for processing packet data, and an audio codec for processing an audio signal, such as a voice signal.

The memory unit 223 includes a program memory section and a data memory section. The program memory section stores executable programs for controlling the mobile terminal, and the data memory section temporarily stores data resulting from execution of the programs.

The display unit 227 displays an image signal and data from the control unit 211 on a screen. The display unit 227 may include a panel that is composed of display devices, such as liquid crystal display (LCD) devices or organic light emitting diodes (OLED). Preferably, the panel has touch screen capability.

The control unit 211 controls the overall operation of the mobile terminal. The control unit 211 may include the data processor 221. The control unit 211 is connected to the audio processor 217, data processor 221, memory unit 223 and display unit 227, and controls these components to exchange and process data, and to establish a call.

The control unit 211 includes the GPIO port 225 for signal transmission and reception.

The GPIO port 225 is a general purpose input/output port, and provides a flexible parallel interface allowing various custom connectors. The control unit 211 uses the GPIO port 225 for receiving a key signal, controlling a desired component, and enabling and disabling a component according to a user command.

At the GPIO port 225, which acts as a signal sending and receiving port, the control unit 211 monitors an occurrence of a particular event, such as a voltage change in response to input of the hold key 215*a*. Hence, the control unit 211 can immediately detect an event occurrence (input of the hold key 215*a*) when the level of a voltage fed to the GPIO port 225 changes from 'low' to 'high' or from 'high' to 'low.'

In exemplary embodiments of the present invention, when the voltage level of the constant voltage power unit 213 corresponds to a level of 'high,' a constant voltage current from the constant voltage power unit 213 causes the voltage level at the GPIO port 225 to change from 'low' to 'high.' When the voltage level of the constant voltage power unit 213 corresponds to a ground voltage level, a constant voltage current from the constant voltage power unit 213 causes the voltage level at the GPIO port 225 to change from 'high' to 'low,' which enables the control unit 211 to detect input of the hold key 215*a*. That is, a constant voltage pulse of a certain magnitude (a high pulse or low pulse) fed to the GPIO port 225 results in a voltage change at the GPIO port 225, and the control unit 211 recognizes input of the hold key 215*a* by detecting the voltage change.

The constant voltage power unit 213 supplies a preset rated voltage. In one exemplary implementation, the preset rated voltage comprises approximately in the range of 1.775 to 3 volts. It is to be understood that other voltage input sources and means can be used within the scope of the present invention. For example, a voltage source that varies, yet provides the GPIO port a voltage change condition with a selected range (for example, 1.775 to 3 volts) in a certain manner, can be used that can be analyzed by the control unit 211 to determine whether a hold key input has been received.

In FIG. 2, when the hold key 215*a* is pressed, an instantaneous electrical connection is made between the constant voltage power unit 213 and the GPIO port 225 via contact C, and a constant voltage current is supplied from the constant voltage power unit 213 via the GPIO port 225 to the control unit 211. Thus, the control unit 211 detects input of the hold key 215*a* through a hardware mechanism.

Figure 3:
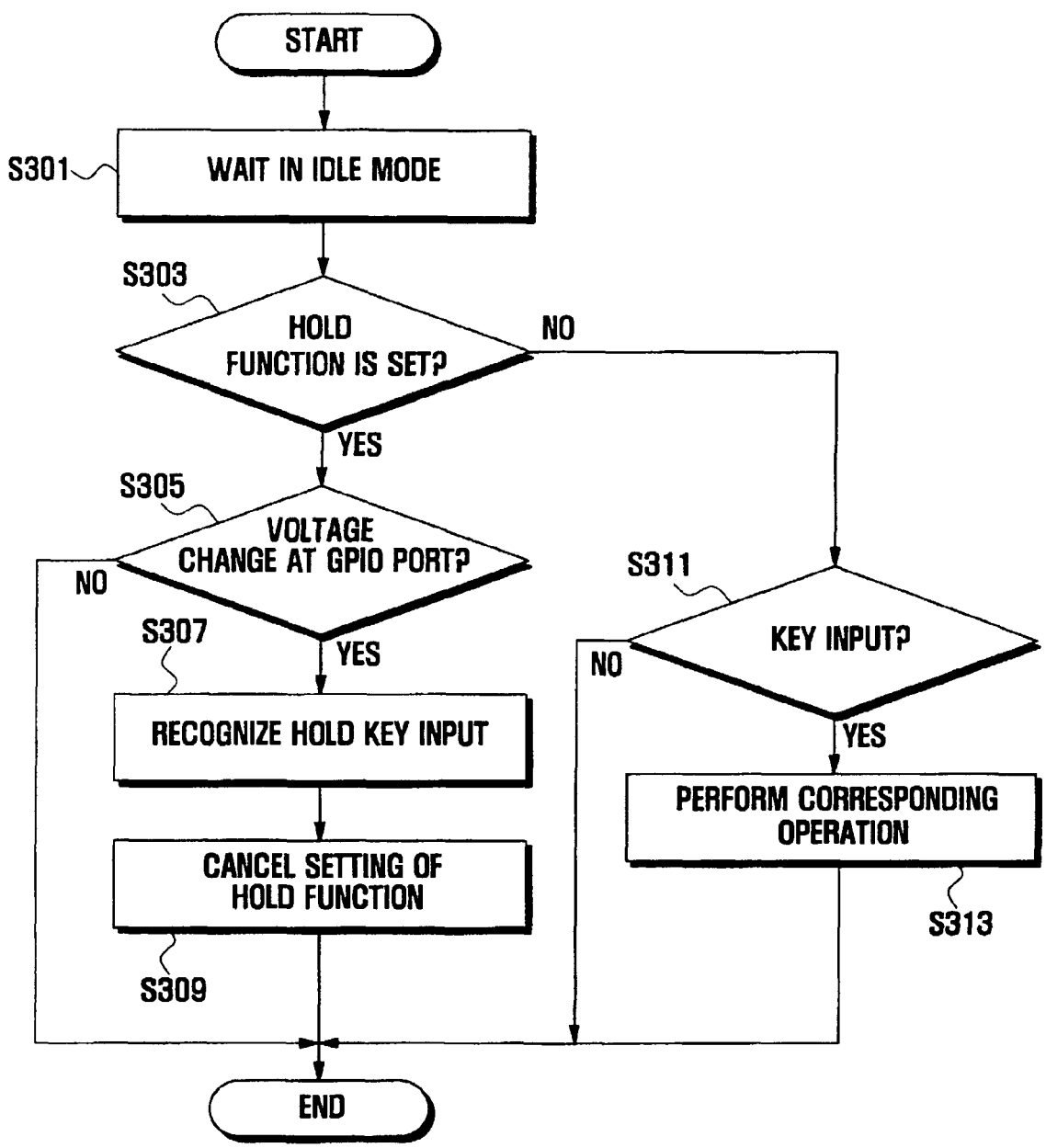
FIG. 3 is a flow chart illustrating steps of a hold function control method according to another exemplary embodiment of the present invention.

FIG. 3 is a flow chart illustrating steps of a hold function control method for a mobile terminal according to another exemplary embodiment of the present invention. Referring to FIGS. 2 and 3, the method is described below.

The mobile terminal is powered on and waits in an idle mode, in step S301. The control unit 211 then determines whether the hold function is set, in step S303. When the hold function is set, key inputs are blocked or cancelled. The hold function can be set during the idle mode by inputting the hold key 215*a* or by a combination of the hold key 215*a* and other keys.

In exemplary embodiments of the present invention, when the user inputs the hold key 215*a*, the GPIO port 225 and constant voltage power unit 213 are electrically interconnected then disconnected. Thus, a constant voltage pulse is fed to the GPIO port 225 and the voltage level at the GPIO port 225 changes from 'low' to 'high.' Alternatively, in the case where the voltage level of the constant voltage power unit 213 corresponds to a ground voltage level, the voltage level at the GPIO port 225 may change from 'high' to 'low.' The control unit 211 recognizes a voltage change at the GPIO port 225 as input of the hold key 215*a*. Further, the hold key 215*a* can be implemented using a one-touch switch capable of making an electrical connection between the GPIO port 225 and constant voltage power unit 213.

If the hold function is determined to be set at step S303, the control unit 211 determines whether a voltage change is detected at the GPIO port 225, in step S305.

If a voltage change is detected at the GPIO port 225, the control unit 211 recognizes the voltage change as input of the hold key 215*a*, in step S307, and cancels the hold function setting, in step S309. When the hold function is set, input of the hold key 215*a* is treated as a hold function cancellation command. In exemplary embodiments of the present invention, a hold function cancellation command is directly recognized through a hardware process (an electrical connection between the GPIO port 225 and constant voltage power unit 213) without a procedure to determine whether a key input is a hold key input, thus reducing the time necessary to cancel the hold function setting.

If no hold function is determined to be set at step S303, the control unit 211 determines whether a key is input from the key input unit 215, through a normal key handling process, in step S311. If a key is input, the control unit 211 performs a corresponding operation, in step S313.

As apparent from the above description, exemplary embodiments of the present invention provide a method and apparatus for hold function control in a mobile terminal, wherein hold function command cancellation is directly recognized through a hardware mechanism. As a result, an extraneous process to determine whether a command of hold function cancellation is input is not needed, thereby reducing the time necessary to cancel the hold function setting.

Certain exemplary embodiments of the present invention can also be embodied as computer-readable codes on a computer-readable recording medium. The computer-readable recording medium is any data storage device that can store data which can thereafter be read by a computer system. Examples of the computer-readable recording medium include, but are not limited to, read-only memory (ROM), random-access memory (RAM), CD-ROMs, magnetic tapes, floppy disks, optical data storage devices, and carrier waves (such as data transmission through the Internet). The computer-readable recording medium can also be distributed over network-coupled computer systems so that the computer-readable code is stored and executed in a distributed fashion. Also, functional programs, codes, and code segments for accomplishing the present invention can be easily construed as within the scope of the invention by programmers skilled in the art to which the present invention pertains.

While the present invention has been particularly shown and described with reference to certain exemplary embodiments thereof, it will be understood by those of ordinary skill in the art that various changes in form or detail may be made therein without departing from the spirit and scope of the present invention as defined by the appended claims and equivalents thereof.

What is claimed is:

1. A terminal for controlling a hold function, the terminal comprising:
    a controller comprising a general purpose input/output (GPIO) port;
    a voltage power unit for supplying a voltage; and
    a hold key for making an electrical connection between the GPIO port and the voltage power unit in response to pressing of the hold key;
    wherein the controller is configured to:
    sense a change in the voltage fed to the GPIO port by the electrical connection between the GPIO port and the voltage power unit;
    recognize first and second inputs of the hold key according to the sensed voltage change;
    activate, according to the first input of the hold key, hold function for blocking execution of function corresponding to input of at least one of the other keys according to the recognized input; and
    deactivate, according to the second input of the hold key, hold function.

2. The terminal of claim 1, wherein the hold key comprises a one-touch switch capability for making an electrical connection between the GPIO port and voltage power unit.

3. The terminal of claim 1, wherein a constant voltage pulse is generated by the instantaneous electrical contact and fed to the GPIO port in response to pressing the hold key.

4. The terminal of claim 1, wherein the voltage power unit supplies a preset rated voltage.

5. The terminal of claim 4, wherein the preset rated voltage is approximately in the range of 1.775 and 3 volts.

6. The terminal of claim 4, wherein the preset rated voltage corresponds to a ground voltage.

7. A hold function control method for a terminal whose control unit includes a general purpose input/output (GPIO) port, the method comprising:
    determining whether a hold function for blocking execution of function corresponding to input of at least one of the other keys is set;
    detecting a voltage change at the GPIO port electrically connected to a voltage power unit through a hold key in response to pressing of the hold key;
    recognizing the detected voltage change as a first input of the hold key when the hold function is not configured, and as a second input of the hold key when the hold function is configured;
    activating the hold function setting according to the first input of the hold key when the hold function is not configured; and
    deactivating the hold function setting according to the second input of the hold key when the hold function is configured.

8. The hold function control method of claim 7, further comprising performing a corresponding operation in response to input of a key while the hold function is not set.

9. The hold function control method of claim 7, wherein the hold function is set by inputting a particular key or a combination of keys.

10. The hold function control method of claim 7, wherein, in the detecting of a voltage change, the control unit detects a voltage change at the GPIO port by sensing a constant voltage pulse delivered through an instantaneous electrical contact between a constant voltage power unit and the GPIO port.

11. The hold function control apparatus of claim 2, wherein the electrical connection is momentary.

12. A non-transitory computer readable medium having stored thereon instructions for a hold function control method for a mobile terminal whose control unit includes a general purpose input/output (GPIO) port, the instructions comprising:
    a first set of instructions for determining whether a hold function for blocking execution of function corresponding to input of at least one of the other keys is set;
    a second set of instructions for detecting a voltage change at the GPIO port electrically connected to a voltage power unit through a hold key in response to pressing of the hold key;
    a third set of instructions for recognizing the detected voltage change as a first input of the hold key when the hold function is not configured, and as a second input of the hold key when the hold function is configured;
    a fourth set of instructions for activating the hold function setting according to the first input of the hold key when the hold function is not configured, or deactivating the hold function setting according to the second input of the hold key when the hold function is configured.

13. The terminal of claim 1, wherein the controller cancels a hold function setting based on the sensed voltage charge generated at the GPIO port.

* * * * *